United States Patent [19]

Borsuk et al.

[11] Patent Number: 4,747,658
[45] Date of Patent: May 31, 1988

[54] FIBER OPTIC CONTACT

[75] Inventors: Leslie M. Borsuk, Los Alamitos; Patrick G. Corrales, Garden Grove, both of Calif.

[73] Assignee: International Telephone and Telegraph Corporation, New York, N.Y.

[21] Appl. No.: 474,755

[22] Filed: Mar. 14, 1983

[51] Int. Cl.$^4$ ............................................. G02B 6/36
[52] U.S. Cl. ............................... 350/96.20; 350/96.21
[58] Field of Search ............... 350/96.20, 96.21, 96.22, 350/96.23

[56] References Cited

U.S. PATENT DOCUMENTS

| | | | |
|---|---|---|---|
| 3,947,182 | 3/1976 | McCartney | 350/96.22 |
| 4,193,665 | 3/1980 | Arnold | 350/96.22 |
| 4,373,777 | 2/1983 | Borsuk et al. | 350/96.20 |
| 4,392,713 | 7/1983 | Piter et al. | 350/96.21 |
| 4,411,491 | 10/1983 | Larkin et al. | 350/96.20 |

FOREIGN PATENT DOCUMENTS

| | | | |
|---|---|---|---|
| 0032466 | 7/1981 | European Pat. Off. | 350/96.22 |
| 2824507 | 12/1978 | Fed. Rep. of Germany | 350/96.22 |

*Primary Examiner*—William L. Sikes
*Assistant Examiner*—Akm E. Ullah
*Attorney, Agent, or Firm*—Thomas L. Peterson

[57] ABSTRACT

A fiber optic contact comprising a ferrule having an alignment sleeve mounted on its forward end so that the mating end face of the ferrule is positioned between the front and rear of the alignment sleeve. A releasable positive interlock is provided between the sleeve and the ferrule so that the sleeve may be removed for cleaning the mating end face of the ferrule, yet the sleeve will not be accidentally removed from the ferrule during use of the contact in a cònnector. Vent holes are provided in the intermediate region of the alignment sleeve so that dust or other particles in the sleeve will be forced out of the sleeve through the vent holes when the ferrule of a second contact is slid into the alignment sleeve to mate with the ferrule upon which the alignment sleeve is mounted.

17 Claims, 3 Drawing Sheets

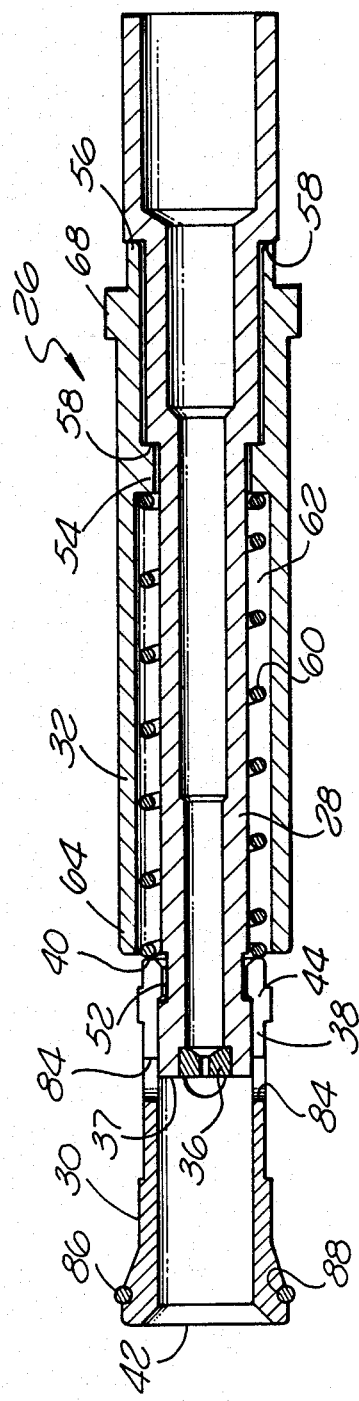
FIG. 3
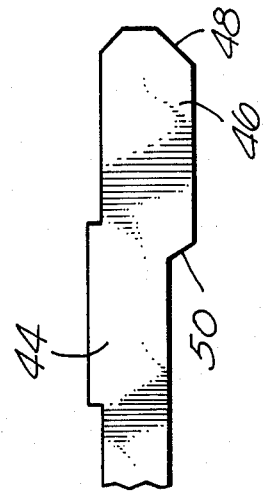
FIG. 6
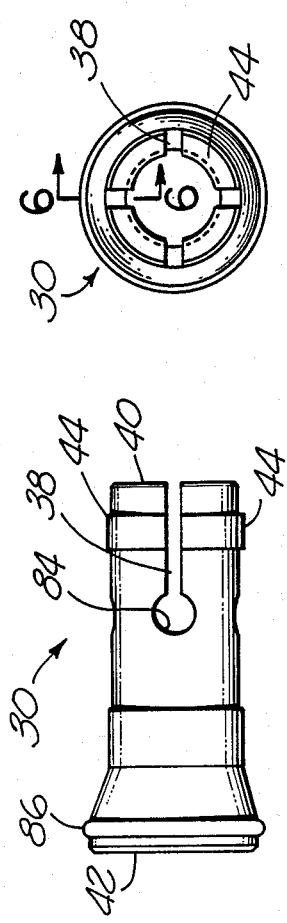
FIG. 5
FIG. 4

FIBER OPTIC CONTACT

BACKGROUND OF THE INVENTION

The present invention relates generally to a fiber optic contact and, more particularly, to a unique alignment sleeve for the ferrule of a fiber optic contact.

In many fiber optic connectors, a special guide block is mounted in one half of the connector assembly which contains precisely dimensioned fiber optic ferrule alignment bores or sleeves. Such fiber optic connectors are disclosed in U.S. Pat. No. 3,947,182 and our co-pending application Ser. No. 377,302, filed May 12, 1982, entitled "Fiber Optic Contact Retention Assembly."

It is desirable to have a fiber optic ferrule and alignment device therefore which may be incorporated into a standard electrical connector without altering the connector structure. Thus, it is not possible in such situations to utilize a special guide block for aligning the mating ferrules in the connector. It is, therefore, desirable to have an alignment sleeve mounted directly on the end of one of the mating fiber optic ferrules of the connector. U.S. Pat. No. 4,183,619 discloses a fiber optic connector in which one ferrule of each mating pair has a plastic alignment sleeve mounted on its forward end by friction. However, because the mating ferrules have an interference fit with the plastic sleeve and the plastic is subject to creep, it is possible that the sleeve will become loose after a large number of matings of the ferrules in the sleeve, or removals of the sleeve from one of the ferrules to clean the end face thereof. Furthermore, with such a plastic sleeve, as in other prior art cylindrical alignment sleeves, it is possible for wear particles produced within the sleeve by numerous matings and unmatings of the connector to become deposited upon the mating end faces of the mating ferrules when they are inserted into the opposite ends of the sleeve resulting in light transmission losses.

It is, therefore, the object of the present invention to provide an alignment sleeve for the ferrule of a fiber optic contact which cannot be inadvertently removed from the ferrule during normal usage, and which is designed in such a fashion to substantially reduce the amount of dust or other particles which may become deposited upon the end faces of the mating ferrules in the sleeve.

SUMMARY OF THE INVENTION

According to one aspect of the present invention, there is provided a fiber optic contact in which a releasable positive interlock is provided between the alignment sleeve and the fiber optic ferrule of the contact, which may be released only when the contact is removed from the connector in which it is to be assembled so that the sleeve may not loosen or become disconnected from the ferrule during engaging and disengaging of the mating halves of a connector incorporating the contact alignment arrangement of the invention. Furthermore, the interlock arrangement may be easily released in order to allow the alignment sleeve to be removed from the ferrule, when the contact is removed from the connector, to permit cleaning of the mating end face of the ferrule.

According to another aspect of the present invention, there is provided an alignment sleeve for a fiber optic ferrule having one or more vent holes in an intermediate region of the sleeve at the point of engagement of the mating fiber optic ferrules therein so that particles in the sleeve will be exhausted out through the vent holes in the sleeve when the mating ferrule is pushed into the sleeve.

BRIEF DESCRIPTION OF THE DRAWINGS

FIG. 3 is a longitudinal sectional view through the contact of the present invention having the alignment sleeve mounted on the ferrule thereof, with the contact shown in its "free state" outside of the connector insert;

FIG. 4 is a side elevational view of the alignment sleeve of the present invention;

FIG. 5 is a rear end view of the alignment sleeve; and

FIG. 6 is a fragmentary, longitudinal sectional view taken along line 6—6 of FIG. 5 showing the end of one of the spring locking tangs incorporated in the alignment sleeve of the invention.

DESCRIPTION OF THE PREFERRED EMBODIMENT

Figure 1:
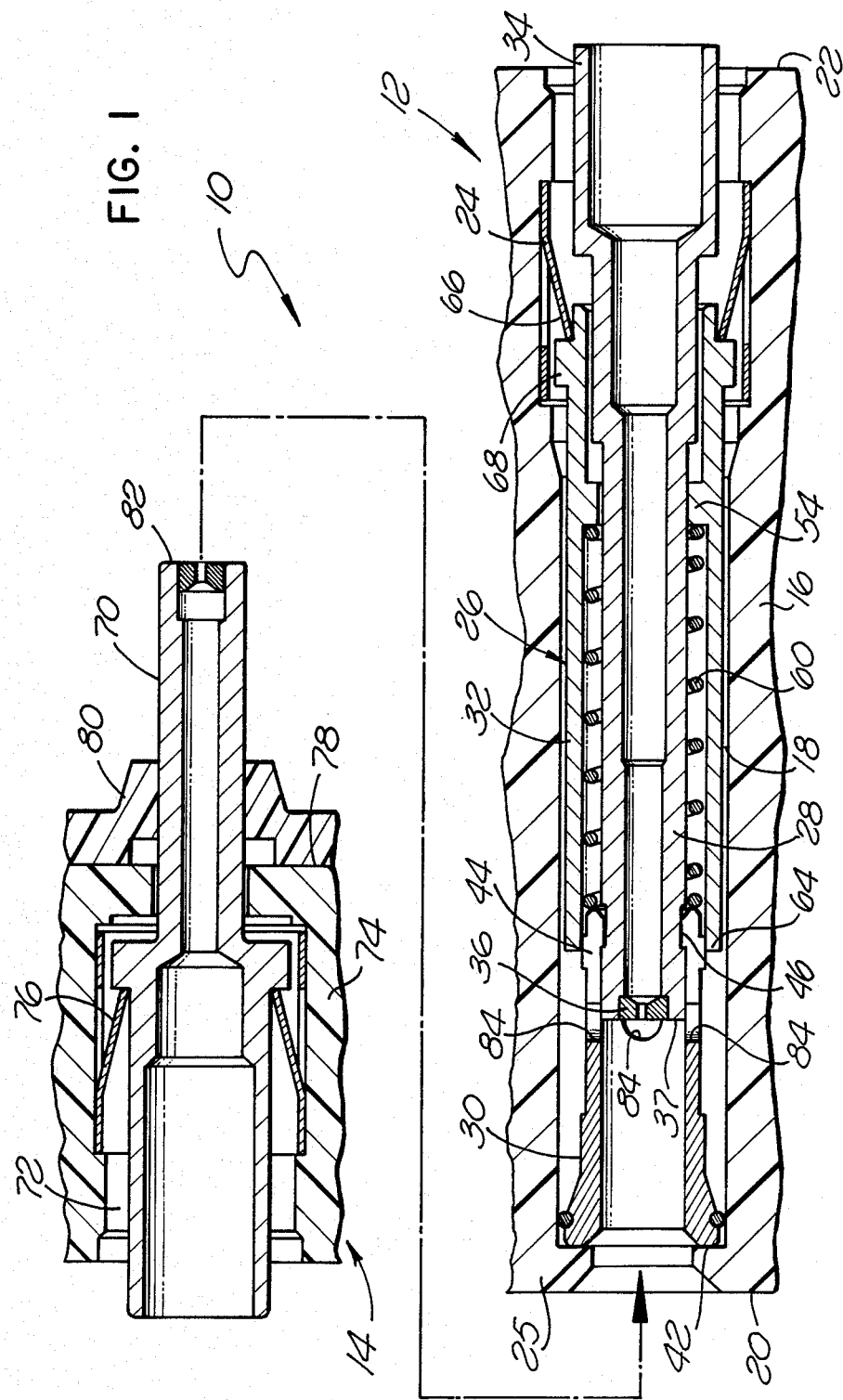
FIG. 1 is an exploded, fragmentary longitudinal sectional view through the mating halves of a connector incorporating the novel fiber optic ferrule alignment mechanism of the present invention, the two halves being shown in an unmated condition.

Referring now to the drawings in detail, FIG. 1 illustrates a connector, generally designated 10, comprising a first connector member 12 and a second connector member 14, either one of which may be the plug half while the other is the receptacle half, and both of which may be of a structure typically utilized for electrical connectors. As illustrated, the connector 10 utilizes a contact retention arrangement of the rear insert, rear release type which is in widespread use in electrical connectors for both military and commercial applications. Other types of contact retention arrangements could also be used.

The connector 12 comprises an insert or insulator 16 having a contact passage 18 therein extending from the front face 20 to the rear face 22 of the insert. A contact retention clip 24 such as disclosed in U.S. Pat. No. 3,158,424 is mounted in the contact passage. An inwardly extending flange 25 is formed at the forward end of the contact passage providing a "closed entry" which is conventional in the electrical connector art. If a front release contact retention arrangement were utilized, the flange 25 would be eliminated.

The fiber optic contact of the present invention, generally designated 26, is mounted in the passage 18 from the rear of the insert 16. The contact comprises basically a fiber optic ferrule 28, an alignment sleeve 30 having a precisely dimensioned bore therethrough, and an outer hollow tubular member 32 which surrounds the ferrule. The rear portion 34 of the ferrule is enlarged to receive a fiber optic cable, not shown. The fiber of the cable is stripped of its jacket, and the end of the fiber is centered within the ferrule by means of a watch jewel 36 mounted in the front mating end 37 of the ferrule, as disclosed in U.S. Pat. No. 4,351,586.

FIG. 3 illustrates the contact 26 in its "free state" outside of the contact passage 18. The alignment sleeve 30 is mounted on the forward end of the ferrule 28. The sleeve may be formed of metal or plastic. The sleeve is formed with a plurality of longitudinally extending slots 38, four being shown by way of example only, which extend from the rear 40 of the sleeve forwardly to an intermediate region between the front 42 and the rear of the sleeve. The four slots divide the rear portion of the sleeve into four arcuate spring locking tangs 44, each of which is formed with an inwardly extending locking tab 46 as best seen in FIG. 6. Inclined ramps 48 and 50 are formed on the rear and front, respectively, of each locking tab 46. An annular groove 52 is formed in the outer surface of the ferrule 28 adjacent to its front mating end 37. The groove has an axial dimension for receiving the locking tabs 46 of the tangs 44 on the sleeve. When the sleeve is pushed rearwardly over the forward end of the ferrule, the ramp 48 will engage the front edge of the ferrule causing the resilient tangs 44 to deflect outwardly and ride over the forward end of the ferrule until the tabs 46 snap into the groove 52 in the ferrule.

The tubular member 32 which surrounds the ferrule has an inwardly extending annular flange 54 thereon adjacent to its rear end 56 which abuts against a forwardly facing shoulder 58 on the ferrule. A coil spring 60 is disposed in the annular space 62 formed between the tubular member 32 and the outer surface of the ferrule. The coil spring extends from the flange 54 to the rear 40 of the alignment sleeve. The spring biases the outer tubular member 32 rearwardly relative to the ferrule to the position illustrated in FIG. 3 whereupon the flange 54 abuts the shoulder 58, and the forward end 64 of the tubular member is positioned just behind the rear 40 of the alignment sleeve. Preferably, the spring is under a small load in the free state of the contact.

It will be appreciated that when the outer tubular member 32 is in the position illustrated in FIG. 3, the alignment sleeve may be pulled off of the ferrule since the ramps 50 on the locking tabs will cooperate with the forward edge of the groove 52 causing the spring tangs 44 to deflect outwardly thereby releasing the tabs 46 from the groove. Thus, the alignment sleeve may be easily removed for cleaning the front mating end face 37 of the ferrule.

When the contact 26 is mounted in the passage 18 in insert 16, as illustrated in FIG. 1, the coil spring 60 is further loaded or compressed and the forward end 64 of the tubular member 32 will slide over the outer ends of the tangs positively locking the tabs 46 on the tangs within the groove 52. Thus, it will be appreciated that the tangs 44 and groove 52 in the ferrule, and the outer tubular member 32 cooperate to provide a releasable positive interlock between the alignment sleeve and the ferrule. The contact is mounted in the passage 18 so that the front 42 of the alignment sleeve abuts the flange 25 at the forward end of the passage, thereby limiting forward movement of the contact in the passage. The spring retention tines 66 on the retention clip 24 in the contact passage engage against the rear of an annular enlargement 68 formed on the rear portion of the tubular member 32 to restrict rearward movement of the contact in the passage. The tines 66 may be deflected outwardly by use of a suitable tubular tool to release the tines from their engagement with the enlargement 68 so that the contact may be withdrawn from the rear of the insert 16 for either cleaning the end face of the ferrule of the contact, or replacing the contact with another like fiber optic contact, or a conventional electrical socket contact.

The mating connector member 14 includes a fiber optic ferrule 70 similar to the ferrule 28 which is mounted in a passage 72 in an insert 74. The contact is retained in the passage by a contact retention clip 76. The forward end of the ferrule extends outwardly from the front face 78 of the insert. The ferrule is dimensioned to have a sliding fit within the alignment sleeve 30. An interfacial seal 80 is mounted on the front face 78 of the insert 74.

Figure 2:
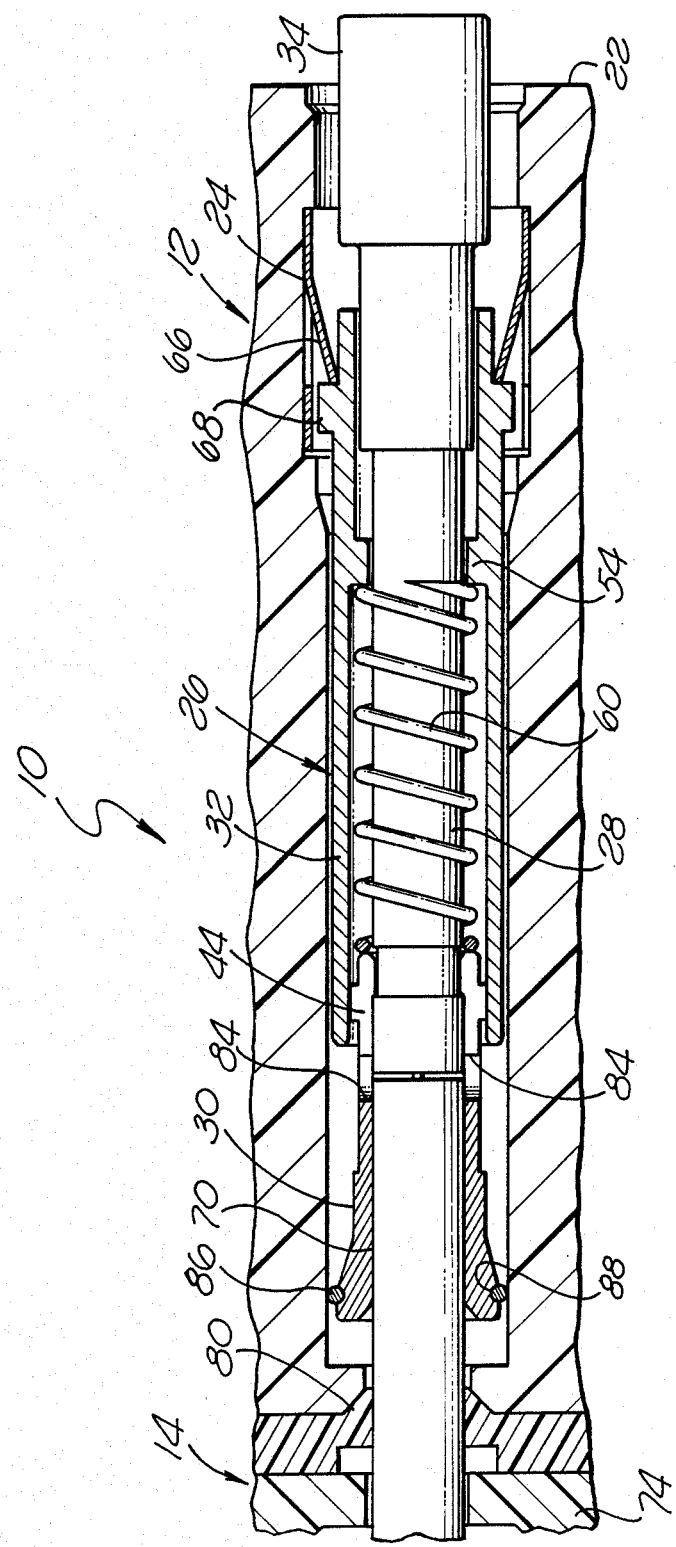
FIG. 2 is a partial longitudinal sectional view similar to FIG. 1 showing the mating halves of the connector fully assembled so that the mating end faces of the ferrules substantially abut each other within the alignment sleeve of the present invention.

When the connector members 12 and 14 are initially mated, the forward end of the ferrule 70 will slide into the alignment sleeve until the front mating end face 82 of the ferrule engages the front mating end face 37 of the ferrule 28 in the connector member 12. Further forward movement of the connector member 14 toward the connector member 12 will cause the alignment sleeve 30 and ferrule 28 of the contact 26 to shift rearwardly within the outer tubular member 32 of the contact 26 until a fully mated condition is established, as illustrated in FIG. 2. With the connector members fully mated, the spring 60 exerts a forwardly directed biasing force on the ferrule 28 to maintain the end faces of the mating ferrules 28 and 70 in engagement.

In order to assure precise lateral alignment of the mating ferrules 70 and 28, it is necessary that the ferrules have a close sliding fit within the interior of the alignment sleeve 30. However, an interference fit as used in the prior art connector discussed previously herein is avoided. With a large number of matings and unmatings of the connector, it is possible that some dust and wear particles may form on the wall of the alignment sleeve which may become deposited on the mating end faces of the ferrules when the ferrule 70 is inserted into the alignment sleeve. In order to minimize this problem, according to the invention there is provided an enlarged circular opening 84 at the inner end of each slot 38 in the alignment sleeve. The center of the opening is in axial alignment with the point of abutment between the end faces of the ferrules in the alignment sleeve. Thus, when the ferrule 70 is inserted into the forward end of the alignment sleeve 30, the air between the mating end faces of the ferrules is compressed because of the piston/cylinder fit between the ferrule and the alignment sleeve, thereby causing the air to be exhausted through the vent openings 84 in the sleeve at a high velocity carrying dust and wear particles out from the interface between the ferrules. While the vent openings 84 are shown as being at the inner ends of the slots 38, the openings could intersect the slots elsewhere than at their ends if the openings are close to the point of abutment of the ferrules. For example, the slots 38 could extend fowardly of the openings 84 in the embodiment shown. Also, in some cases the enlarged vent openings could be eliminated if the slots are sufficiently wide to permit adequate venting therethrough.

Preferably, an elastomeric O-ring 86 is mounted in an annular groove 88 in the forward end of the alignment sleeve. The O-ring has a sealing fit with the wall of the contact passage 18. Thus, when air is exhausted out through the vent openings 84 in the alignment sleeve upon mating of the connector members 12 and 14, the dust and other particles will flow rearwardly through the passage 18 to exit from the rear of the connector, rather than forwardly to the front of the alignment sleeve where they might later enter the sleeve when the connector members are unmated. Furthermore, the O-ring 86 has a sliding fit with the wall of the contact passage 18 so that it will tend to wipe rearwardly any dust or particles which might lie on the surface of the wall of the contact passage. The O-ring serves the further functions of providing vibration dampening for the contact 26 and avoiding wear particles from being produced due to the rubbing of the metallic guide sleeve with the wall of the contact passage, which is typically formed of a hard dielectric.

While the vent opening 84 has been shown as being incorporated in a ferrule alignment sleeve embodying resilient spring locking tangs, it will be appreciated that the vent opening feature of the invention may be incorporated in other forms of fiber optic ferrule alignment sleeves which may, for example, be continuous cylinders.

What is claimed is:

1. A fiber optic contact comprising:
   a fiber optic ferrule having a forward mating end face;
   an alignment sleeve mounted over the forward end of said ferrule, said sleeve having front and rear ends and a substantially constant diameter bore extending between said ends;
   said mating end face of said ferrule being positioned in said bore between said front and rear ends of said sleeve; and means including interengaging oppositely facing shoulders on said sleeve and said ferrule providing a releasable positive interlock between said sleeve and said ferrule.

2. A fiber optic contact as set forth in claim 1 wherein:
   said interlock means includes a hollow tubular member surrounding said ferrule and axially movable between a rear position and a forward position;
   in said forward position said tubular member having a forward end surrounding the rear portion of said sleeve to lock the sleeve on said ferrule; and
   in said rear position said tubular member releasing the interlock between said sleeve and said ferrule.

3. A fiber optic contact as set forth in claim 2 including:
   spring means inside said tubular member biasing said ferrule forwardly relative to said tubular member.

4. A fiber optic contact as set forth in claim 3 wherein:
   said spring means engages said alignment sleeve.

5. A fiber optic contact as set forth in claim 2 wherein:
   the rear portion of said alignment sleeve is formed with a plurality of longitudinal slots providing spring locking tangs therebetween;
   an annular groove is formed in the outer surface of said ferrule; and
   said tangs having locking tabs engaging said groove.

6. A fiber optic contact as set forth in claim 5 wherein:
   enlarged openings are formed in said sleeve intersecting said slots, said openings being located at the mating end face of said ferrule.

7. A fiber optic contact as set forth in claim 1 including:
   a resilient sealing ring on said alignment sleeve adjacent to said front end thereof.

8. A fiber optic contact as set forth in claim 6 including:
   a resilient sealing ring on said alignment sleeve between said openings and said front end of said sleeve.

9. A fiber optic contact comprising:
   a fiber optic ferrule having a forward mating end face;
   an alignment sleeve mounted over the forward end of said ferrule, said sleeve having front and rear ends;
   said mating end face of said ferrule being positioned between said front and rear ends of said sleeve; and
   at least one opening in the wall of said sleeve located at the mating end face of said ferrule whereby when a second ferrule is pushed into the forward end of said sleeve dust or other particles within the sleeve will be forced out of said sleeve through said opening.

10. A connector comprising:
    an insert having a passage therethrough extending from a front face to a rear face of said insert;
    a fiber optic contact mounted in said passage;
    a contact retention clip releasably retaining said contact in said passage;
    said fiber optic contact comprising:
    a fiber optic ferrule having a forward mating end face;
    an alignment sleeve mounted over the forward end of said ferrule, said sleeve having front and rear ends;
    said mating end face of said ferrule being positioned between said front and rear ends of said sleeve; and
    means providing a releasable positive interlock between said sleeve and said ferrule only when said contact is mounted in said passage.

11. A fiber optic contact as set forth in claim 10 wherein:
    said interlock means includes a hollow tubular member surrounding said ferrule;
    said tubular member having a forward end surrounding the rear portion of said sleeve to lock the sleeve on said ferrule; and
    when said contact is removed from said passage said tubular member being slidable rearwardly relative to said ferrule for releasing the interlock between said sleeve and said ferrule.

12. A fiber optic contact as set forth in claim 11 including:
    spring means inside said tubular member biasing said ferrule forwardly relative to said tubular member.

13. A fiber optic contact as set forth in claim 12 wherein:
    said spring means engages the rear end of said alignment sleeve.

14. A fiber optic contact as set forth in claim 11 wherein:
    the rear portion of said alignment sleeve is formed with a plurality of longitudinal slots providing spring locking tangs therebetween;
    an annular groove is found in the outer surface of said ferrule; and
    said tangs having locking tabs engaging said groove.

15. A fiber optic contact as set forth in claim 14 wherein:
    enlarged openings are formed in said sleeve intersecting said slots, said openings being located at the mating end face of said ferrule.

16. A fiber optic contact as set forth in claim 10 including:
    a resilient sealing ring on said alignment sleeve adjacent to said front end thereof, said ring engaging the wall of said passage.

17. A fiber optic contact as set forth in claim 15 including:
    a resilient sealing ring on said alignment sleeve between said openings and said front end of said sleeve, said ring engaging the wall of said passage.

* * * * *